F. G. KOLLENBERG.
FUNNEL.
APPLICATION FILED MAR. 6, 1907.
947,917.
Patented Feb. 1, 1910.
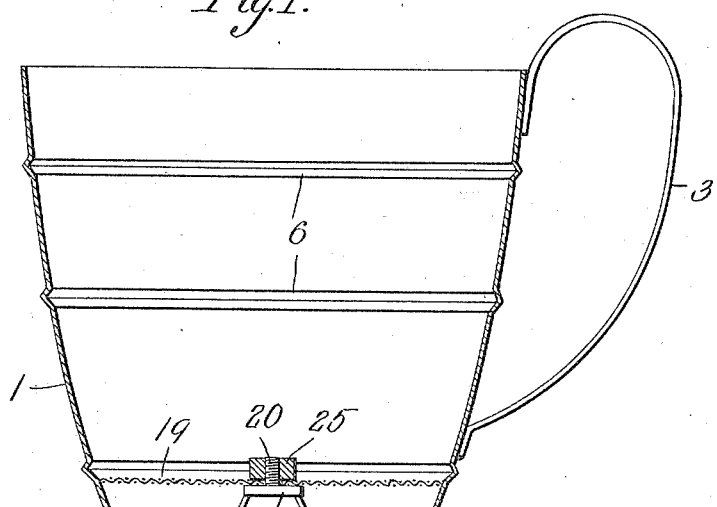
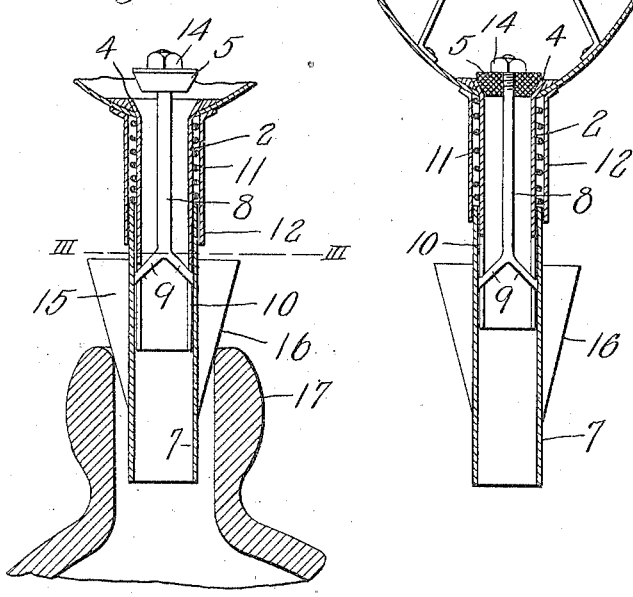
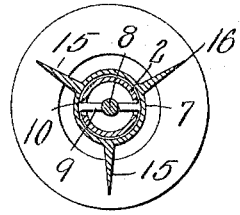
Witnesses
Inventor;
F. G. Kollenberg
By
Attorney

UNITED STATES PATENT OFFICE.

FREDERICK G. KOLLENBERG, OF OWENSBORO, KENTUCKY, ASSIGNOR OF ONE-HALF TO P. R. LANCASTER, OF OWENSBORO, KENTUCKY.

FUNNEL.

947,917. Specification of Letters Patent. Patented Feb. 1, 1910.

Application filed March 6, 1907. Serial No. 360,828.

*To all whom it may concern:*

Be it known that I, FREDERICK G. KOLLENBERG, of Owensboro, in the county of Daviess, State of Kentucky, have invented certain new and useful Improvements in Funnels, of which the following is a specification.

The present invention relates to improvements in funnels, more especially of that class of funnels which is provided with the foraminous strainer, and the invention consists in the construction hereinafter pointed out.

Referring to the accompanying drawing, which constitutes a part of this application, Figure I is a diametrical, vertical section, partially in elevation, of a preferred form of embodiment of my funnel, showing the valve closed. Fig. II is a view similar to Fig. I, illustrating the lower part of my funnel with the valve open, and showing the discharge end of my funnel inserted into the neck of a jug, by engagement whereof with the valve-actuating member the valve is opened, as illustrated therein. Fig. III is a section on the line III—III of Fig. II looking downwardly.

Referring to the numerals on the drawing, 1 indicates a vessel, preferably of metal, of any preferred shape and dimensions, which terminates in a tube 2, the members 1 and 2 in themselves constituting an ordinary funnel. The vessel 1 is preferably of curvilinear contour, as illustrated, and is provided with a handle 3 for convenience of manipulation.

In the bottom of the vessel 1, about the mouth of the tube 2, I provide a valve-seat 4 of any preferred type, and coöperating therewith a corresponding valve 5, the valve-seat and valve being preferably of the cone shape illustrated.

The valve is provided with automatic actuating means for keeping it normally closed preferably, but operative, at will, for the discharge of the contents of the vessel 1 into the tube 2.

By reason of the employment of a valve in the bottom of the vessel 1, it is not only practicable to utilize the vessel as a liquid measure for determining the quantity of any liquid which it may contain, but it is also practicable to discharge from it a portion of its contents when filled in measured quantities. This may be accomplished by providing in the wall of the vessel 1 a series of peripheral markings 6, or indicators of quantity. The vessel 1 being made of metal, the indicators 6 may be conveniently formed by creasing the metal of the wall at required intervals. The markings 6 may be located wherever required and as often as desired to indicate subdivisions of the total capacity of the vessel, whatever the total capacity may be.

I prefer to employ as a means for actuating the valve 5 a terminal tube 7 operatively connected with said valve and telescoping the lower end of the tube 2, whereon it is free to slide within fixed limits.

I prefer to locate the tube 7 outside of the tube 2 and to connect it with the valve through a valve-stem 8, as by branches 9, the branches 9, which may be of any preferred and available number, though preferably a plurality, being free to work in slots or kerfs 10, formed in the lower end of the tube 2.

The tube 7 is kept normally urged toward movement away from the vessel 1, and the valve is thereby closed upon its seat 4, as by a coil spring 11, interposed between the upper end of the tube 7 and the bottom of the vessel 1. It is chiefly for convenience of accommodation of the spring 11 that the tube 7 is located outside of the tube 2 instead of inside of it, because such relative disposition of the parts provides for the unobstructed outflow through the tube 2, and for the employment of a tubular casing 12 about the spring 11 and telescoping the upper end of the tube 7, the casing 12 being co-axial with the tubes 2 and 7 and secured to the bottom of the vessel 1. The function of the tubular casing 12 is not only to properly aline the spring 11 to the performance of its function, but to protect it from rust or other contamination. The presence of the casing 12 adds but little to the diameter of the tube 7 and affords a compact construction and attractive finish to the article.

The power of the spring 11 whereby the proper seating of the valve 5 upon its seat is attained and secured is regulated by a nut 14, threaded to the upper end of the valve-stem 8 and serving to fix the distance between the valve and the upper edge of the tube 7. By screwing the nut 14 down upon the valve, it may be made to more closely compress the coils of the spring 11, and thereby to increase the resistance of the spring. On the other hand, the turning of the nut to give an upward movement will have the effect of relieving the pressure upon the coils of the spring, and thereby diminishing its resistance.

As a means for lifting the tube 7 against the force of its spring 11 and thereby opening the valve 5, as shown in Fig. II, I prefer to provide upon the outside of the tube 7 vertically disposed wings 15, preferably having inclined or downwardly tapering edges 16, as shown in Figs. I and II. The wings 15 are preferably brazed, or otherwise firmly secured, to the outside of the tube 7, and are adapted to the performance of two functions. One is to afford convenient means of lifting the tube 7, by engagement of the edges 16 of the wings 15 with a jug neck 17 of any available size. The other function is that it provides a vent for the air within the receptacle displaced by the discharge thereinto of liquid from the vessel 1 through the funnel, to the lower end of which, in effect, the wings 15 are attached.

Within the vessel 1 and fitting it when in place snugly on all sides, I provide a foraminous strainer 19, which may consist of a disk of reticulated material. The strainer is mounted within the vessel 1 by means which render it readily removable and renewable as often as occasion may require. To that end, I prefer to employ a centrally located threaded stud 20, carried as upon a base-plate 21 that is supported above and secured to the lower end of the vessel 1, as by legs 22 and 23 secured at their lower ends to the bottom of the funnel and supporting the base-plate 21 at their upper ends. The strainer 19, being provided with an aperture for the reception of the stud 20, may be secured thereto against the base-plate 21 as by a nut 25 threaded to the stud.

In operation, the vessel 1 is supplied with liquid contents, filling it to any extent desired, the portion of it in the bottom of the vessel being strained by passing through the strainer 19. Until it is desired to liberate the contents, in whole or in part, from the vessel 1, they are confined therein by the normal seating of the valve 5 against its seat. At the will of the operator, a portion of indeterminate and measurable quantity, may be discharged from the vessel 1 upon the opening of the valve 5, which is readily effected, as by grasping the outside of the tube 7 and lifting it, or by inserting it into the mouth of a jug, as shown in Fig. II, and pressing, if need be, gently down upon the handle 3 until the valve is lifted from its seat, the weight of the contents of the vessel, which when the tube 7 is inserted into the mouth of a receptacle whose wall may engage the wings 15, tending of itself to open the valve. Immediately upon cessation of the lifting force upon the tube 7, the spring 11, projecting it downwardly, automatically closes the valve 5.

If it be desired to discharge the contents of the vessel 1 in measured quantity, the vessel may be filled, more or less, by measurement upon the indicators 6 and the entire contents so measured discharged. If, however, the vessel be filled, or approximately filled, a measured quantity, corresponding to the difference indicated between the indicators 6 upon the vessel, may be discharged and the remaining contents retained within the vessel.

The adjustment of the resistance of the spring 11 by manipulation of the nut 14 has already been specified, as well as the removability of the strainer 19 through manipulation of the nut 25. It is, however, proper to add that by reason of the presence of the nuts 25 and 14, respectively, the mechanism of my funnel may be readily disassembled so that access to all of its parts may be readily had for the purpose of easily and effectually cleaning it.

The removability and consequent renewability of the strainer 19 is an important feature of my invention, inasmuch as it is comparatively easy to cleanse a smooth surface of any liquid, even of one of the most viscous consistency. It may be, on the other hand, difficult to thoroughly cleanse a strainer, but by providing ready means for renewing the strainer, one strainer may be replaced by another with facility and despatch as often as the application of the funnel to the serving of different liquids may require.

What I claim is:

1. In a funnel, the combination with its vessel and tube, of a base plate, legs connected with the vessel and supporting said base plate centrally within the vessel above the tube, a strainer fitting said funnel, and means for removably securing said strainer to the base plate.

2. A funnel provided with a foraminous strainer spaced away from the bottom of the funnel, a base plate, legs secured at their lower ends to the bottom of the funnel, and at their upper ends to said base plate, a centrally located threaded stud carried by said base plate, a nut upon said stud, the foraminous strainer coming between the plate and the nut.

In testimony whereof I have hereunto signed my name in the presence of two subscribing witnesses.

FREDERICK G. KOLLENBERG.

Witnesses:
    JAS. G. WALL,
    CHAS. G. NALLE.